United States Patent
Gelfenbeyn et al.

(10) Patent No.: US 9,875,741 B2
(45) Date of Patent: Jan. 23, 2018

(54) SELECTIVE SPEECH RECOGNITION FOR CHAT AND DIGITAL PERSONAL ASSISTANT SYSTEMS

(71) Applicant: Google Inc., Mountain View, CA (US)

(72) Inventors: Ilya Genadevich Gelfenbeyn, Sunnyvale, CA (US); Artem Goncharuk, Arlington, VA (US); Ilya Andreevich Platonov, Berdsk (RU); Pavel Aleksandrovich Sirotin, Sunnyvale, CA (US); Olga Aleksandrovna Gelfenbeyn, Yurga (RU)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 14/775,729

(22) PCT Filed: Mar. 15, 2013

(86) PCT No.: PCT/RU2013/000202
§ 371 (c)(1),
(2) Date: Sep. 14, 2015

(87) PCT Pub. No.: WO2014/142702
PCT Pub. Date: Sep. 18, 2014

(65) Prior Publication Data
US 2016/0027440 A1    Jan. 28, 2016

(51) Int. Cl.
*G10L 15/00* (2013.01)
*G10L 15/22* (2006.01)
(Continued)

(52) U.S. Cl.
CPC .............. *G10L 15/32* (2013.01); *G10L 15/02* (2013.01); *G10L 15/07* (2013.01); *G10L 15/22* (2013.01);
(Continued)

(58) Field of Classification Search
None
See application file for complete search history.

(56) References Cited

U.S. PATENT DOCUMENTS

2004/0030557 A1   2/2004   Culy et al.
2007/0136059 A1*  6/2007   Gadbois ............... G10L 15/32
                                                  704/246

(Continued)

FOREIGN PATENT DOCUMENTS

WO    WO 2012094422 A2 *   7/2012   ........... G10L 15/183

*Primary Examiner* — Richa Mishra
(74) *Attorney, Agent, or Firm* — Middleton Reutlinger (57) ABSTRACT

Disclosed are computer-implemented methods and systems for dynamic selection of speech recognition systems for the use in Chat Information Systems (CIS) based on multiple criteria and context of human-machine interaction. Specifically, once a first user audio input is received, it is analyzed so as to locate specific triggers, determine the context of the interaction or predict the subsequent user audio inputs. Based on at least one of these criteria, one of a free-diction recognizer, pattern-based recognizer, address book based recognizer or dynamically created recognizer is selected for recognizing the subsequent user audio input. The methods described herein increase the accuracy of automatic recognition of user voice commands, thereby enhancing overall user experience of using CIS, chat agents and similar digital personal assistant systems.

12 Claims, 10 Drawing Sheets

(51) Int. Cl.
*G10L 15/07* (2013.01)
*G10L 15/02* (2006.01)
*G10L 15/32* (2013.01)
*G10L 15/08* (2006.01)

(52) U.S. Cl.
CPC .. *G10L 2015/088* (2013.01); *G10L 2015/223* (2013.01); *G10L 2015/228* (2013.01)

(56) References Cited

U.S. PATENT DOCUMENTS

| | | | |
|---|---|---|---|
| 2010/0274560 A1 | 10/2010 | Goorevich et al. | |
| 2012/0016678 A1* | 1/2012 | Gruber | G06F 17/3087 704/275 |
| 2012/0215539 A1* | 8/2012 | Juneja | G10L 15/30 704/254 |
| 2013/0080171 A1* | 3/2013 | Mozer | G10L 15/22 704/251 |
| 2013/0332158 A1 | 12/2013 | Garfield et al. | |
| 2014/0058732 A1 | 2/2014 | Labsky et al. | |

* cited by examiner

SELECTIVE SPEECH RECOGNITION FOR CHAT AND DIGITAL PERSONAL ASSISTANT SYSTEMS

TECHNICAL FIELD

This disclosure relates generally to speech recognition and, more particularly, to the technology for dynamic selecting and adapting speech recognizers in chatbots or digital personal assistant systems based on multiple criteria as described herein.

DESCRIPTION OF RELATED ART

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

Speech recognition systems, which are also known as automatic speech recognition (ASR) systems, are conventionally used for translation of spoken words into text or control commands. These systems are widely used in various computer-based applications and voice user interfaces including, for example, voice control, voice dialing, data entry, speech-to-text processing, and so forth. In one particular example, speech recognition systems may be utilized by chat information systems (CIS), also known as ""chatbots,"" or digital personal assistant systems.

A CIS may interact with users in natural language to simulate an intelligent conversation and provide personalized assistance to the users. For example, the users may ask the CIS questions such as ""Where is the nearest hotel?"" or ""When is my next appointment?"" and receive corresponding answers. The users may also ask the CIS to perform certain functions including, for example, generating emails, making phone calls, searching information (e.g., current whether), acquiring data, re-addressing user requests, navigating user, providing notifications, reminders, recommendations, suggestions, and so forth. CIS and digital personal assistant systems are widely used and are of great help for computer users and holders of portable electronic devices, smart phones, tablet computers, gaming consoles, smart television systems, and so forth.

Due to the nature and diversity of questions, requests and other voice commands the users may ask the CIS, today's speech recognition systems may not always provide reliable and accurate voice recognition of such questions and voice commands. Essentially, many speech recognition systems relay on statistic-based techniques or machine-learning algorithms, and, therefore, trained to reliably recognize a limited number of words and phrases the user may ask. For example, while the user input ""Make a call to"" may be reliably recognized by most speech recognition systems, names such as ""Artem"" or ""Ilya"" may not be properly recognized by such systems.

Moreover, portable electronic devices including cellular phones, smart phones or personal digital assistants may have limited computational or memory resources for running complex speech recognition systems as part of CIS or digital personal assistant systems. If this is the case, the portable electronic devices may utilize third party speech recognition systems. However, some speech recognition systems may not be easily tuned, configured or trained. Thus, it is often a difficult task to unambiguously recognize voice user commands especially when the commands include names, nicknames, titles, addresses, geographical locations, and similar inputs. Therefore, there is still a need for new approaches in speech recognition systems in CIS, chat agents and various digital personal assistant systems.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure facilitates the technology for intelligent selection of speech recognition systems in Chat Information Systems (CIS) based on multiple criteria. This technology overcomes at least some drawbacks of the prior art systems improving reliability and accuracy for automatic recognition of user voice commands and, thereby, enhancing overall user experience of using CIS, chat agents and similar digital personal assistant systems.

According to an aspect of the present disclosure, a method is provided for speech recognition with a CIS. The method may comprise receiving, by a processor operatively coupled to a memory, an audio input. The method may further comprise recognizing, by a first speech recognizer of a plurality of speech recognizers, a first part of the audio input to generate a first recognized input. The method may further comprise identifying, by the processor, at least one trigger in the first recognized input, and based on the identification, selecting, by the processor, a second speech recognizer of the plurality of speech recognizers. The method may further comprise recognizing, by the second speech recognizer, a second part of the audio input to generate a second recognized input.

In certain embodiments, the method may further comprise separating, by the processor, the audio input into a plurality of parts having at least the first part of the audio input and the second part of the audio input. The separating of the audio input may comprise recognizing, by one of the plurality of speech recognizers, at least a beginning part of the audio input to generate a recognized input. In certain embodiments, the method may further comprise selecting, by the processor, the first speech recognizer, based at least in part on the recognized input. The at least one trigger may include a type of the audio input identified based at least in part on the first recognized input. The type of the audio input may include a free speech input or a pattern-based speech input. The pattern-based speech input may include various predefined words, phrases or sentences, names, nicknames, titles, addresses, geographical location names, and numbers. The first speech recognizer or the second speech recognizer may include a pattern-based speech recognizer. The first speech recognizer or the second speech recognizer may include a free-dictation recognizer. The first speech recognizer or the second speech recognizer may include an address book based recognizer. The first speech recognizer or the second speech recognizer may include a dynamically created recognizer.

In certain embodiments, the method may further comprise combining, by the processor, the first recognized input and the second recognized input. In certain embodiments, the method may further comprise generating, by the CIS, a response based at least in part on the first recognized input or the second recognized input.

According to another aspect of the present disclosure, a method is provided for speech recognition in a CIS. The"

method may comprise receiving, by a processor operatively coupled with a memory, a first audio input. The method may further comprise recognizing, by a first speech recognizer of a plurality of speech recognizers, at least a part of the first audio input to generate a first recognized input. The method may comprise receiving, by the processor, a second audio input. The method may comprise identifying, by the processor, at least one trigger in the first recognized input, and based on the identification, selecting, by the processor, a second speech recognizer of the plurality of speech recognizers. The method may comprise recognizing, by the second speech recognizer, at least a part of the second audio input to generate a second recognized input.

In certain embodiments, the at least one trigger may include a type of the first audio input, wherein the type of the audio input includes a free speech input or a pattern-based speech input. The at least one trigger may include a predetermined word or phrase. The at least one trigger may include a predetermined word pattern. The at least one trigger may include an indication of a type of the second audio input.

In certain embodiments, the method may further comprise predicting, by the processor, the type of the second audio input based at least in part on one or more outputs generated by the CIS. The prediction may be based at least in part on a chat context between a user and the CIS.

In certain embodiments, the method may further comprise dynamically generating, by the processor, a pattern-based speech recognizer based at least on part on the prediction. The first speech recognizer or the second speech recognizer may include one of the following: a pattern-based speech recognizer, a free-dictation recognizer, an address book based recognizer, and a dynamically created recognizer.

In certain embodiments, the method may further comprise combining, by the processor, the first recognized input and the second recognized input. In certain embodiments, the method may further comprise generating, by the processor, a response of the CIS based at least in part on the first recognized input or the second recognized input.

According to yet another aspect of the present disclosure, a method is provided for speech recognition in a CIS. The method may comprise receiving, by a processor operatively coupled with a memory, a first audio input. The method may further comprise recognizing, by a first speech recognizer of a plurality of speech recognizers, at least a part of the first audio input to generate a first recognized input. The method may further comprise providing, by the processor, a response to the first recognized input utilizing the CIS. The method may further comprise determining, by the processor, a type of the response. The method may further comprise receiving, by the processor, a second audio input, and based on the determination, selecting, by the processor, a second speech recognizer of the plurality of speech recognizers. The method may further comprise recognizing, by the second speech recognizer, at least a part of the second audio input to generate a second recognized input.

In certain embodiments, the selecting of the second speech recognizer may include selecting, by the processor, a free-dictation recognizer, when the type of response defines that the second audio input includes a free speech of a user. In certain embodiments, the selecting of the second speech recognizer may include selecting, by the processor, a pattern-based recognizer, when the type of response defines that the second audio input includes a pattern-based speech of a user. In certain embodiments, the selecting of the second speech recognizer may include selecting, by the processor, an address book based recognizer, when the type of response defines that the second audio input includes a name or nickname from a digital address book. In certain embodiments, the selecting of the second speech recognizer may include selecting, by the processor, a dynamically created recognizer, when the type of response defines that the second audio input includes an item from a list storing items of the same type or optionally of different types.

In certain embodiments, the response may be generated by the CIS. In certain embodiments, the method may further comprise generating, by the processor, a second response utilizing the CIS based at least in part on the second recognized input.

According to yet another aspect of the present disclosure, a system is provided for speech recognition in a CIS. The system may comprise a communication module configured to receive one or more audio inputs. The system may further comprise two or more speech recognizers configured to generate recognized inputs. The system may further comprise a decision making logic configured to identify at least one trigger in one of the recognized inputs and, based on the at least one trigger, select one of the two or more speech recognizers for performing speech recognition of at least a part of the one or more audio inputs. The at least one trigger may include a type of the one or more audio inputs or prediction regarding a type of the one or more audio inputs.

In further example embodiments of the present disclosure, the method steps are stored on a machine-readable medium comprising instructions, which when implemented by one or more processors perform the recited steps. In yet further example embodiments, hardware systems or devices can be adapted to perform the recited steps. Other features, examples, and embodiments are described below.

BRIEF DESCRIPTION OF THE DRAWINGS

Embodiments are illustrated by way of example, and not by limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, tablet computer, laptop computer), game console, handheld gaming device, cellular phone, smart phone, smart television system, and so forth.

In general, the embodiments of the present disclosure refer to methods and corresponding systems for speech recognition in various chat information systems, chat agents or digital personal assistants. More specifically, there may be employed a number (two or more) of various speech recognition systems configured to process analog or digital acoustic information (i.e., a user input) and translate it into processor-readable digital signals that may be recognized as speech components (characters, words, phrases). The present technology provides for selective enablement of specific speech recognition system from a plurality of predetermined speech recognition systems for processing particular parts of user input based at least in part on the context of the user input, human-machine interaction and, optionally, other criteria.

In certain example embodiments, the user audio input may be separated into multiple parts, whereas particular speech recognition systems may be selected for recognizing and interpreting each of these parts. Alternatively, for each new user audio input, a particular speech recognition system may be selected. The selection may be based on a number of criteria including, for example, the presence of "triggers" in the user audio inputs or based on predictions of user inputs. The triggers may relate to predetermined words, phrases, word patterns, and so forth. The triggers may also relate to a context of interaction between the user and CIS, type of user audio input, and so forth. In certain embodiments, the triggers may be readily present in the user audio input, however, in other embodiments, the triggers for future user inputs may be predicted based on a number of predetermined rules or criteria. In light of this, the user audio inputs, when received in interaction with the CIS, may be dynamically analyzed so as to intelligently select a specific speech recognition system for every user audio input or even every part of each user audio input.

Essentially, the user audio input may refer to free-speech input or pattern-based speech input. In general, the pattern-based speech input may include one or more words/phrases/sentences of a specific type. For example, the pattern-based speech inputs may include names, nicknames, titles, street names, city names, geographical locations, event titles, numbers, e-mail addresses, phone numbers, codes, proper nouns, template words, phrases or sentences. For example, the pattern-based speech input may include names like "John," "Bill," "Mark," "Steven," and so forth. It can also include templates of phrases such as, for example, "What is the weather in *" or other templates including wildcard operators. In contrast, the free-speech input may refer to arbitrary words or phrases of multiple or uncategorized types. Accordingly, one should understand that user audio inputs may include one or more types, or a hybrid of both free-speech and pattern-based speech inputs. For example, the user input may be "Write an e-mail to John Smith saying that I will be late for the meeting," whereas the part "Write an e-mail to * saying that" would relate to a first pattern based speech input, the part "John Smith" would relate to a second pattern-based speech input, while the part "I will be late for the meeting" would relate to a free-speech input. As will be described below, for each of these parts different speech recognition systems may be used.

On the other hand, the speech recognition systems may include rule-based speech recognizers (also known as pattern-based speech recognizers), free-dictation recognizers (also known as free-speech recognizers), address book based recognizers, and dynamically created recognizers. It should be understood that regardless of what specific type of speech recognizers is used or selected, it may use one or more of the following techniques for speech recognition: an acoustic-phonetic approach, pattern recognition approach, statistics based approach or machine-learning approach (e.g., neural networks based algorithms).

Essentially, the rule-based recognizers may be based on a grammar set of dialog engines of CIS and conversation logs collected during the operation of recognizer. The resulting rules (or "grammars") may define the sequences of words that could be used in a sentence. Free-speech recognizers may be universal recognizers trained to recognize arbitrary user inputs. Address book based recognizers may be based on a model trained or created based on a complete set of user's address book entries (e.g., a digital phone book or user contacts aggregated from an email account or social network).

Dynamically created recognizers may be based on a dynamic model trained or created utilizing user's address book entries (names, addresses, phone numbers, and optionally other address book information). These recognizers may be dynamically created based on the context of conversion between a user and CIS, although in some other cases, these recognizers may be dynamically created based on predictions of future or following user inputs. The recognizers created based on the prediction of next phrase, it is expected that the user follows certain paths within a speech tree. For example, if a user asks about weather today, he may also ask about the weather tomorrow. It should be noted that the predictions may include a number of predetermined speech patterns defined, for example, in a CIS dialog definition database or system. These predictions may also include one or more rules defining dialog trees.

In light of the above, the present technology provides for processing every user audio input and optionally all its parts to select a proper speech recognizing system for its interpretation. The selection may rely on triggers present in the user audio input, context of human-CIS interaction, or based on certain predictions of the following speech. With respect to the above given example of the input "Write an e-mail to John Smith," the part "Write an e-mail to" may be reliably recognized by a default pattern-based speech recognizer (e.g., based on CIS dialog definitions), however the part " I will be late for the meeting" may not be reliably recognized by this pattern-based recognizer. Accordingly, for the part "I will be late for the meeting" another recognizer, such as a free-dictation recognizer, may be selected to provide more accurate speech recognition.

Figure 1:
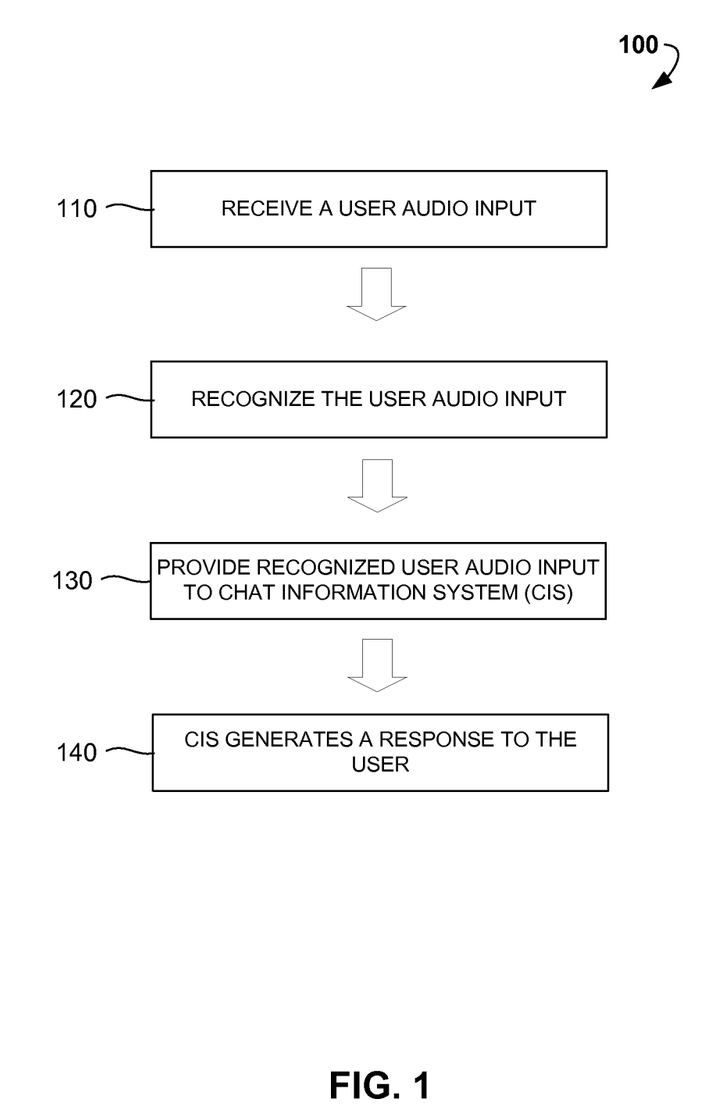
FIG. 1 shows a high level flow diagram of human-CIS interaction according to one or more embodiments.

The above example is further illustrated in FIG. 1, which shows a high level flow diagram of human-CIS interaction, where one or more speech recognizers may be utilized. At operation 110, the CIS may receive a voice input from a user, which is then transmitted to one or more speech recognizers. Accordingly, at operation 120, the one or more speech recognizers recognize the voice user input and generate a recognized input. At the next operation 130, the recognized input may be provided to the CIS for interpretation and making a corresponding action. Specifically, at operation 140, the CIS generates a response and provides it to the user.

Accordingly, the use of various speech recognizers improves accuracy of speech recognition when used in CIS or similar digital personal assistant systems. These and other principles will be now described in greater details by referring to the accompanying drawings.

Figure 2:
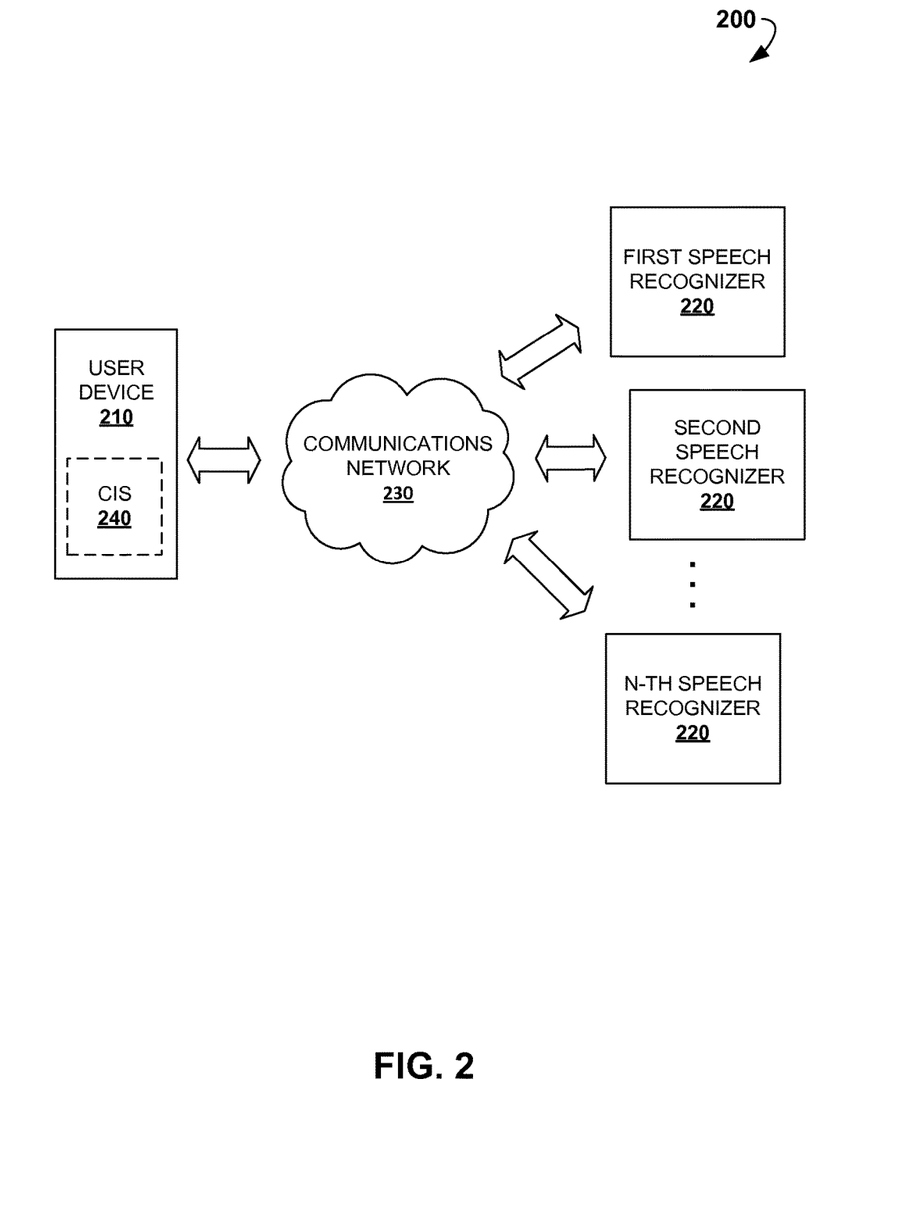
FIG. 2 shows a high-level block diagram of an example system environment suitable for practicing the present technologies for speech recognition.

FIG. 2 shows a high-level block diagram of an example system environment 200 suitable for practicing the present technologies for speech recognition. The system environment 200 may include a user device 210, a plurality (two or more) of speech recognizers 220, and a communications network 230.

According to various embodiments, the user device 210 may refer to a client in "client-server environment". In general, the user device 210 may include a computer (e.g., a desktop computer, laptop computer, tablet computer), smart phone, wireless telephone, cellular phone, television system, gaming console, gaming pad, in-vehicle computer, infotainment systems, smart-home computer, and any other electronic device having at least one processing or computational unit. The user device 210 should be configured to receive or capture user audio inputs (e.g., via a microphone). Furthermore, the user device 210 may run a CIS 240 or any other suitable chat agent, chatbot or digital personal assistant software application. Although it is shown that the CIS 240 runs on the user device 210, the CIS 240 may run on a networked server (not shown), or, in yet another example, the CIS 240 may be a distributed software running on both the user device 210 and a network server (not shown).

Any of the shown speech recognizers 220 may refer to a dedicated software application installed on a computer, server, host, or any other computational device. As discussed above, the speech recognizers 220 may perform automatic digital speech recognition utilizing rule-based (pattern-based) approach, free-dictation (free-speech) approach, address book based approach, and dynamically created recognizing approach. In an example embodiment, the first speech recognizer 220 may be a rule-based speech recognizer, while the second speech recognizer 220 may be a free-dictation recognizer, and N-th speech recognizer 220 may be address book based recognizer.

In certain example embodiments, the speech recognizer 220 may generate a plurality of outputs, each provided with a particular confidence level. Accordingly, there may be provided a technique for selecting a particular output of the plurality of outputs based on a number of predetermined rules. For example, the outputs may be compared to a plurality of syntax patterns (e.g., CIS dialog definition templates) having certain weights using, for example, natural language processing methodologies. Based on the context of human-machine interaction, the most suitable recognition output may be selected.

The communications network 230 can be a wireless or wire network, or a combination thereof. For example, the network may include one or more of the following: the Internet, local intranet, PAN (Personal Area Network), LAN (Local Area Network), WAN (Wide Area Network), MAN (Metropolitan Area Network), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, DSL (Digital Subscriber Line) connection, Ethernet connection, ISDN (Integrated Services Digital Network) line, cable modem, ATM (Asynchronous Transfer Mode) connection, or an FDDI (Fiber Distributed Data Interface) or CDDI (Copper Distributed Data Interface) connection. Furthermore, communications may also include links to any of a variety of wireless networks including, GPRS (General Packet Radio Service), GSM (Global System for Mobile Communication), CDMA (Code Division Multiple Access) or TDMA (Time Division Multiple Access), cellular phone networks, GPS, CDPD (cellular digital packet data), RIM (Research in Motion, Limited) duplex paging network, Bluetooth radio, or an IEEE 802.11-based radio frequency network.

Figure 3:
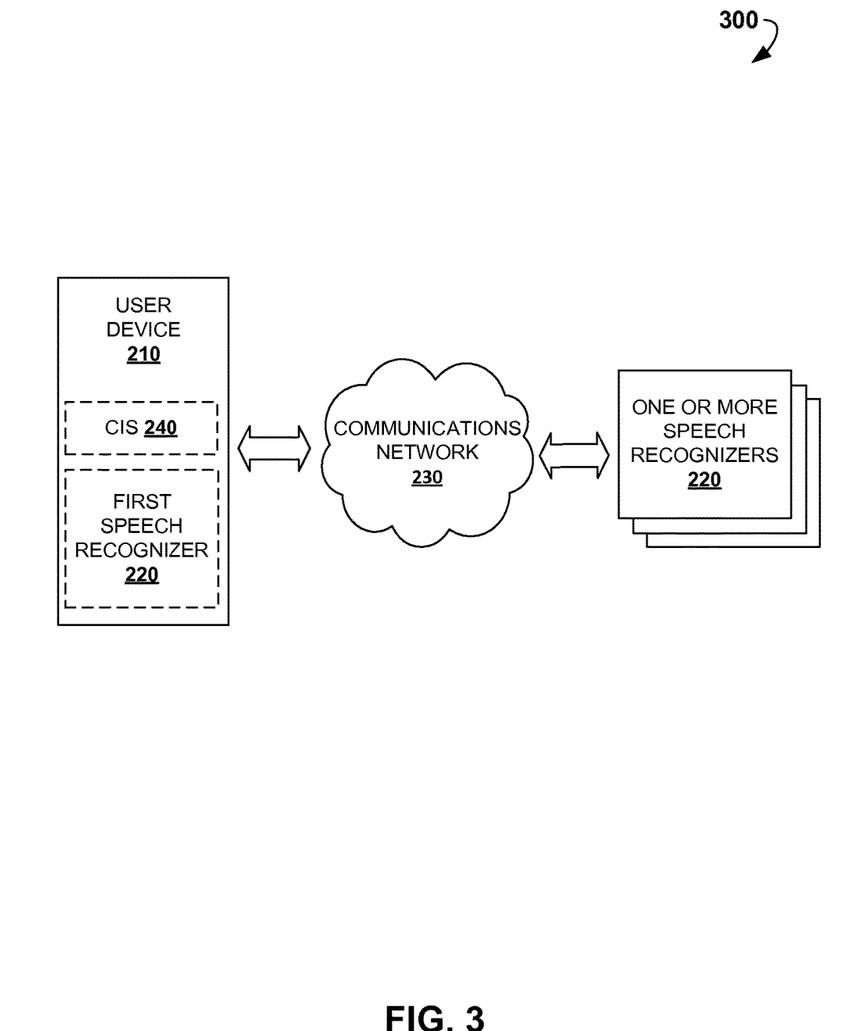
FIG. 3 shows a high-level block diagram of another example system environment suitable for practicing the present technologies for speech recognition.

FIG. 3 shows a high-level block diagram of another example system environment 300 suitable for practicing the present technologies for speech recognition. In particular, in this embodiment, one speech recognizer 220 runs on the user device 210, while at least one other speech recognizer 220 is remote to the user device 210 and runs on one or more server (for example), within a cloud, or as part of a distributed system (not shown).

Figure 4:
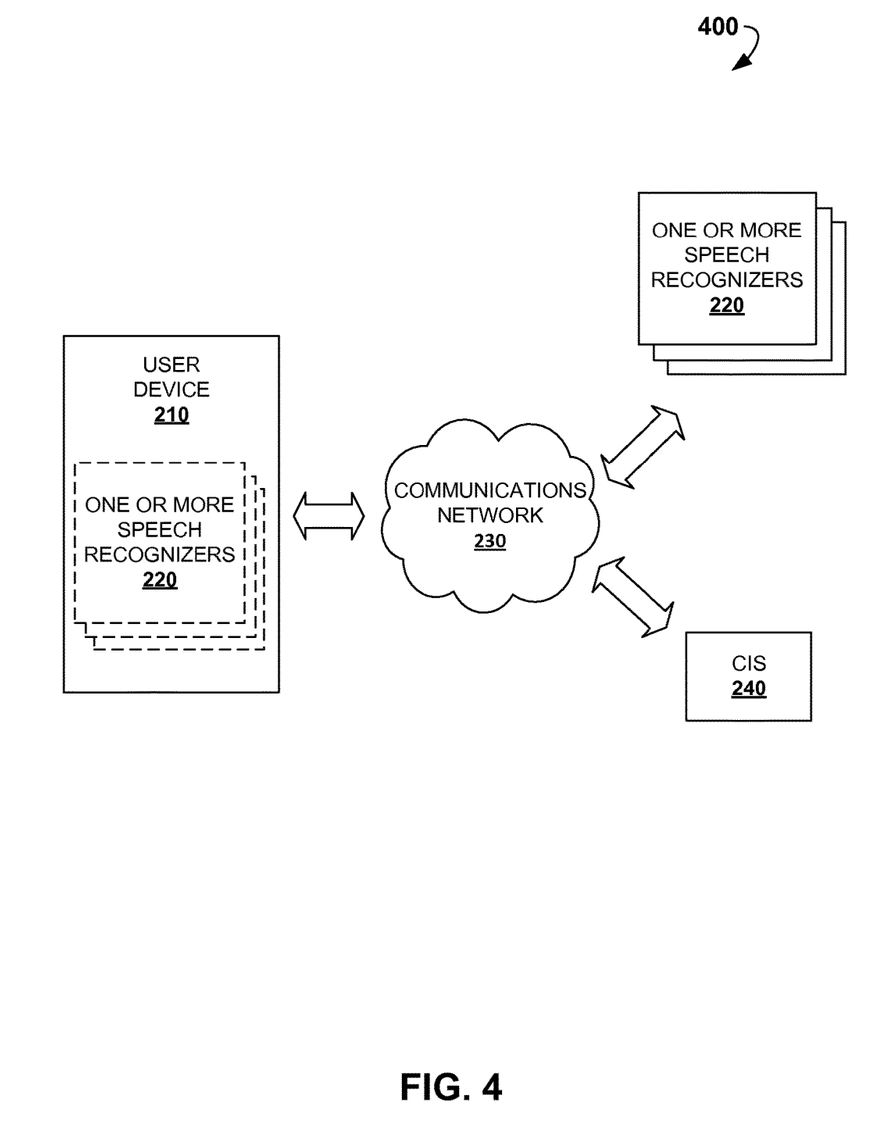
FIG. 4 shows a high-level block diagram of yet another example system environment suitable for practicing the present technologies for speech recognition.

FIG. 4 shows a high-level block diagram of yet another example system environment 400 suitable for practicing the present technologies. In particular, in this embodiment, one or more of speech recognizers 220 run on the user device 210, while one or more of other speech recognizers 220 run on one or more servers or within a cloud. In this example, the CIS 240 also runs on one or more remote servers or within a cloud.

Figure 5:
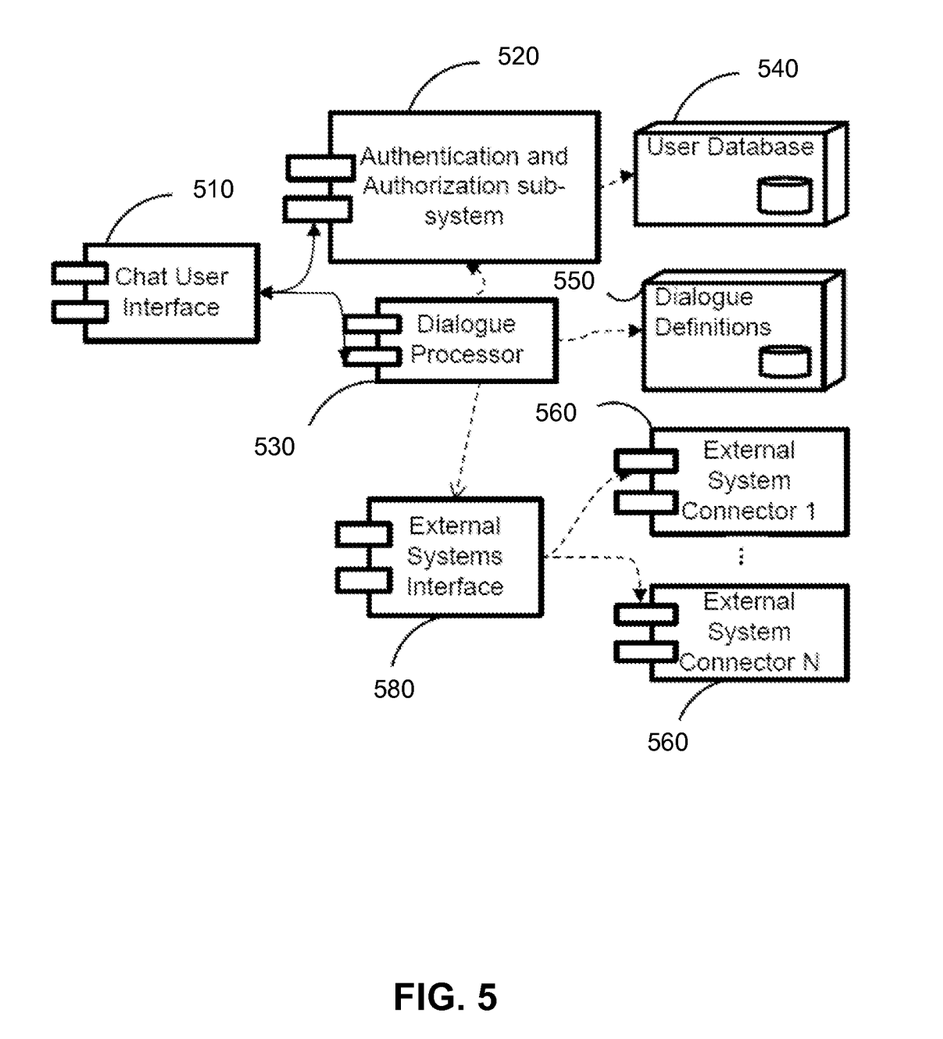
FIG. 5 illustrates a high level diagram of a CIS architecture in accordance with an example embodiment.

FIG. 5 illustrates a high level diagram of system architecture 500 in accordance with the example embodiment. A chat user interface 510 is located on the user device 210. The chat user interface 510 is operatively connected to an authentication and authorization sub-system 520 implemented on a server. The authentication and authorization sub-system 520 retrieves user authentication/authorization data from a remote user database 540. The chat system interface 510 communicates with a dialog processor 530 implemented on the server. In the alternative case, almost all sub-systems could reside on the user device 210 (client).

The dialog processor 530 retrieves dialog definitions from a dialog definitions database 550 based on user actions performed with the chat user interface 510. The dialog definitions cover standard exchange situations, such as, for example, the greetings definitions, looking for weather and working with to-do lists:

User: {"Hi," "Hello," "Hello, *," "G'day"}
 CIS: {"Hello, Master," "Hi, @username"}
 User: {"Weather," "What's the weather like?"}
 CIS: {weather(@userlocation)}
 User: {"I have to *"}
 CIS: {"Do you really want to add * to your to-do list?"}

A dialog processor searches for responses from dialog definitions database 550 based on phrases and words contained in user requests. In addition to words, synonyms can be used, as well as dependencies on previous comments from the user, conditions, variables, etc. In addition, various available information about the user, i.e. user profile and preferences, may be used, which is derived from previous interactions with the user or from other sources (such as address book or user profile in social networks.) The dialog processor communicates with the authentication and authorization sub-system 520 for verifying the user. The dialog processor 430 also interacts with an external system interface 580. The external system interface 480 allows for the dialog processor 530 to send the user requests and additional information about the user to external systems (i.e., information servers) via external system connectors 570. If the dialog calls for connecting to an external service (e.g., "Show me a map of London, please"), the connector can extract, from the phrase, the parameters for working with an external service ("London"), form a request to an external service by using accessible data (e.g., user password for that service), perform additional actions, such as identify current location, and mediate dialog between the user and the external service (for example, when selecting a tour of London). Upon receipt of data from the external service, the connector forms a response to the user, in the user's language.

Figure 6:
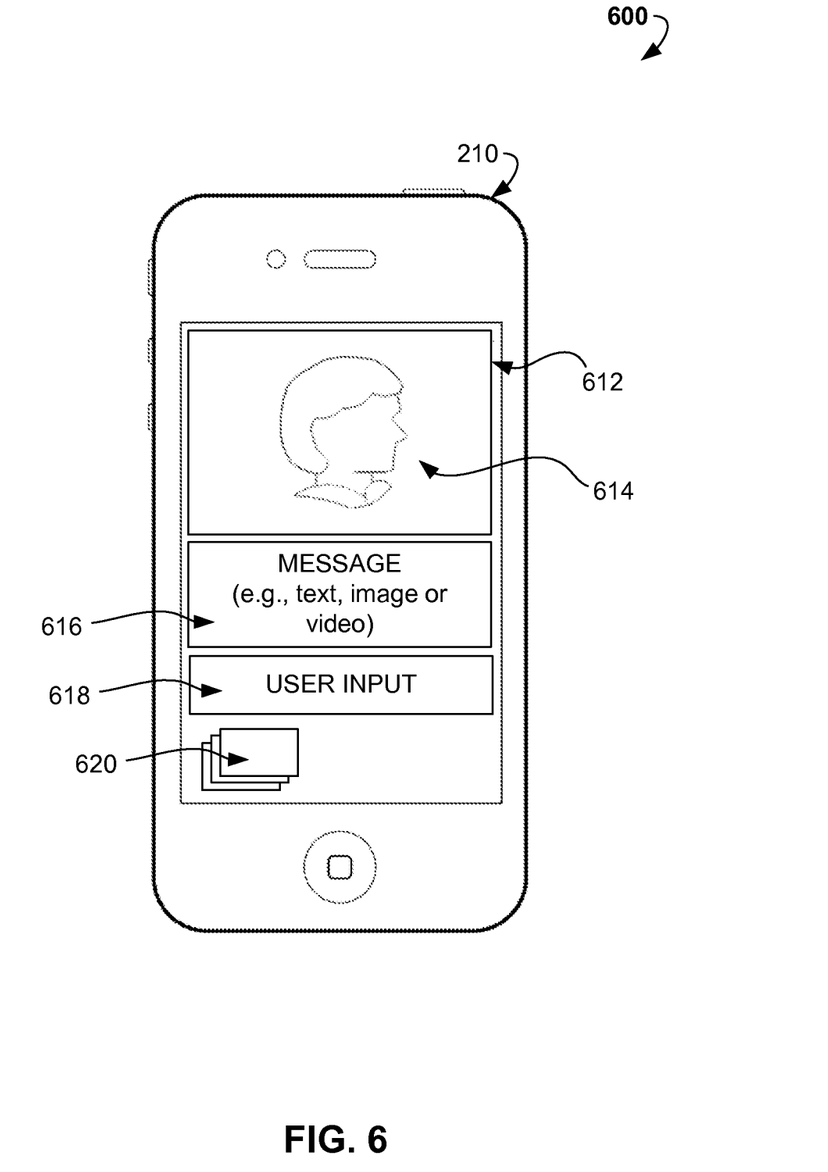
FIG. 6 illustrates a schematic diagram of a user interface with chat features for a user device in accordance with an example embodiment.

FIG. 6 illustrates a schematic diagram of a graphical user interface 600 with chat features for a user device 610 in accordance with an example embodiment. Although as shown the user device 610 is a smartphone, the same or similar graphical user interface 600 may be provided for a desktop or laptop computer, tablet computer, or any other suitable device. In the shown example, the user device 210 includes a touchscreen which displays the user interface 600. In the example embodiment, the user interface 600 includes a tray (output box) 612 where an avatar 614 is displayed. Optionally, the user can select a different avatar, or construct it from various elements (e.g., select clothes, eyes, hair, etc.). Optionally, multiple trays for multiple topics can be employed. The user interface 600 also includes a tray 616 for displaying a message (text, image or video) generated by the system, i.e. a CIS response. The user interface 600 may also include a tray 618 for displaying user input (e.g., a recognized audio input or manual text input). According to certain embodiments, a user may interact with the user interface 600 by making a contact or by touching the trays. The user interface 600 may also include one or more control buttons 620 or hyperlinks. The contact can be a gesture, such as, for example, one or more taps, one or more swipes (from left to right, from right to left, upward and/or downward).

Figure 7:
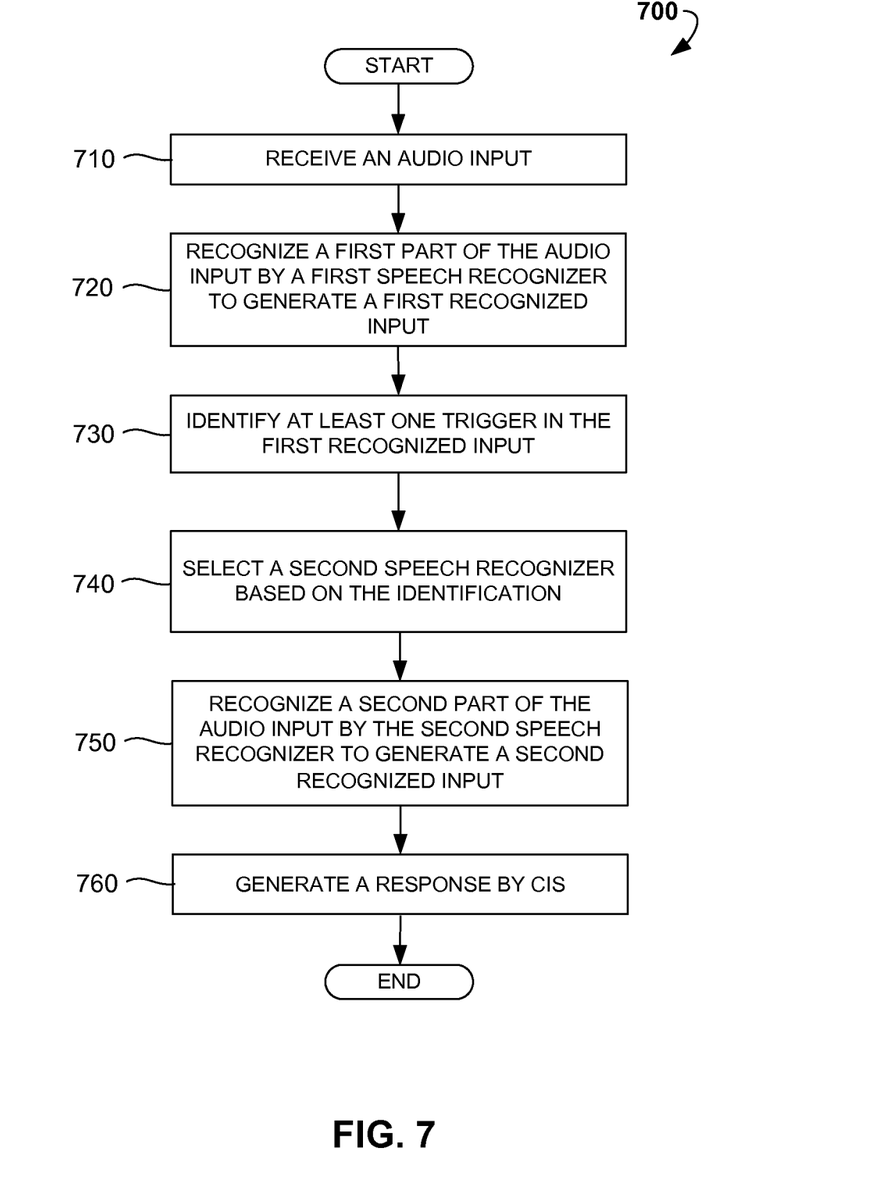
FIG. 7 is a process flow diagram showing a method for speech recognition in a CIS according to an example embodiment.

FIG. 7 is a process flow diagram showing a method 700 for speech recognition in a CIS according to an example embodiment. The method 700 may be performed by processing logic that may comprise hardware (e.g., decision making logic, dedicated logic, programmable logic, and microcode), software (such as software run on a general-purpose computer system or a dedicated machine), or a combination of both. In one example embodiment, the processing logic resides at the CIS 240 and/or the dialog processor 530. In other words, the method 700 can be performed by various components discussed above with reference to FIGS. 2-5.

As shown in FIG. 7, the method 700 may commence at operation 610, with a communication unit of user device 210 (or of the CIS 240 and/or the dialog processor 530) receiving an audio input from a user. The audio input may be captured by a microphone of the device 210. At operation 720, a first speech recognizer 220 of a plurality of speech recognizers recognizes a first part of the audio input to generate a first recognized input. It should be noted that the first part of audio input may be obtained by separating the audio input into two or more parts (e.g., words or phrases).

In certain embodiments, the very first part of the audio input (in other words, "beginning part" of the user audio input) may be recognized using one default speech recognizer 220 (e.g., a free-dictation recognizer) to generate a recognized input. If the recognized input meets predetermined criteria (e.g., have weight, probability or confidence level higher than a predetermined threshold), the same default speech recognizer 220 may be selected for recognizing the first part of the user input. Alternatively, another speech recognizer 220 (e.g., rule-based speech recognizer) may be used to process the first part of the user audio input.

At operation 730, the CIS 240 and/or the dialog processor 530 identifies at least one trigger in the first recognized input. As discussed, the trigger may relate to a type of user audio input (e.g., includes a free speech input or a pattern-based speech input), a type of the first part of the user audio input, a predetermined word or phrase, a word pattern, an indication of type of the user audio input or its parts, and so forth.

At operation 740, the CIS 240 and/or the dialog processor 430 selects a second speech recognizer 220 of the plurality of speech recognizers based on the identification of the at least one trigger as performed at operation 730. At operation 750, the selected second speech recognizer 220 is used for recognizing a second part (i.e., remaining) of the user audio input to generate a second recognized input.

In an example embodiment, when the trigger identified at the operation 740 defies that the first part of user audio input may relate to the free speech input, a rule-based recognizer (or an address book based recognizer or a dynamically created recognizer) is selected as the second speech recognizer at the operation 750. This example may refer to the user input including the phrase, for example, "Write an e-mail to John Smith." In this example, the first part "Write an e-mail to" may be recognized by the first speech recognizer 220 such as a custom rule-based or free-dictation recognizer. However, the second part "John Smith" may be recognized by the second speech recognizer 220 such as an address book based recognizer.

In certain embodiments, the first recognized input and the second recognized input may be combined together by the CIS 240 and/or the dialog processor 530. The combined first and second recognized inputs may be further processed or interpreted. For example, the CIS 240 may generate a response to the combined first and second recognized inputs and further provide it to the user.

At operation 760, the CIS 240 may optionally generate a response to at least one part of the recognized input, i.e. based at least on the first recognized input or the second recognized input. The response may include a text message, an audio message, an image, video message, and/or response meta-data.

Figure 8:
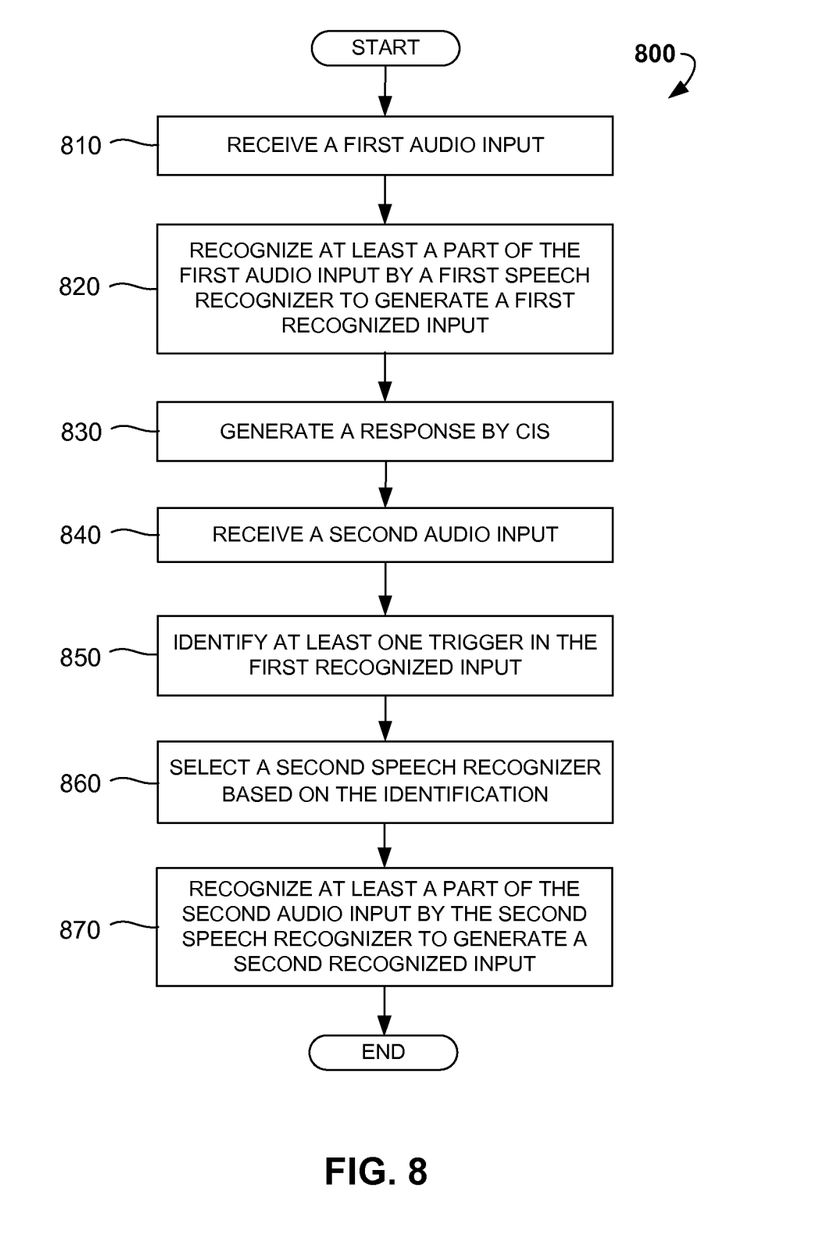
FIG. 8 is a process flow diagram showing another method for speech recognition in a CIS according to an example embodiment.

FIG. 8 is a process flow diagram showing another method 800 for speech recognition in a CIS according to an example embodiment. The method 800 may be performed by processing logic that may comprise hardware (e.g., decision making logic, dedicated logic, programmable logic, and microcode), software (such as software run on a general-purpose computer system or a dedicated machine), or a combination of both. In one example embodiment, the processing logic resides at the CIS 240 and/or the dialog processor 530. In other words, the method 800 can be performed by various units discussed above with reference to FIGS. 2-5.

As shown in FIG. 8, the method 800 may commence at operation 810, with a communication unit of user device 210 (or of the CIS 240 and/or the dialog processor 530) receiving a first audio input from a user. In an example embodiment, the audio input may be captured by a microphone of the device 210 and may include one or more words. At operation 820, a first speech recognizer 220 of a plurality of speech recognizers recognizes the first audio input to generate a first recognized input. It should be noted that the first speech recognizer 220 may be dynamically selected based on a number of predetermined rules or criteria (e.g., based on a type of the first audio input, presence of certain triggers or identifiers). At operation 830, the CIS 240 may generate a response to at least a part of the first recognized input. The response may include a text message, an audio message, an image, a video message, and/or response meta-data.

At operation 840, the communication unit of user device 210 (or of the CIS 240 and/or the dialog processor 530) receiving a second audio input from the user. At operation 850, the CIS 240 and/or the dialog processor 530 identifies at least one trigger in the first recognized input. As discussed, the trigger may relate to a type of user audio input (e.g., includes a free speech input or a pattern-based speech input), a type of the first part of the user audio input, a predetermined word or phrase, a word pattern, an indication of type of the user audio input or its parts, and so forth.

At operation 860, the CIS 240 and/or the dialog processor 430 selects a second speech recognizer 220 of the plurality of speech recognizers based on the identification of the at least one trigger as performed at operation 850. At operation 870, the selected second speech recognizer 220 is used for recognizing the second user audio input to generate a second recognized input. At the following steps (not shown), the CIS 240 may generate a yet another response to at least a part of the second recognized input.

In an example, the first audio input in the CIS 240 may include the phrase "What is the current weather?" This first input may be recognized by a free-dictation recognizer. Once this phrase is recognized, the CIS 240 may provide a response, i.e. a clarifying question such as, for example, "Where would you like to know the current weather?" At this point, the CIS 240 may also predict (i.e., by identifying one or more triggers, e.g., the word "weather" or by defining the context of the interaction) that a response to this CIS question should relate to a certain geographical location, name or other patterned input. For example, the user may provide a second audio input into the CIS 240 in the way of the phrase "In Cupertino." The CIS 240 may therefore use a pattern-based recognizer to recognize this second patterned input. Alternatively, the CIS 240 may use the dynamically created recognizer for recognizing this second input, whereas the dynamically created recognizer may be generated based on a predetermined list of geographical locations. In this regard, those skilled in the art would appreciate that the selection of the second speech recognizer 220 may be based on the prediction or on the context of the conversation between the user and the CIS 240. Once the second audio input is successfully recognized, the CIS 240 may provide another response to the user. For example, the CIS 240 may provide the voice and/or text output "It is 68 Fahrenheit in Cupertino."

Figure 9:
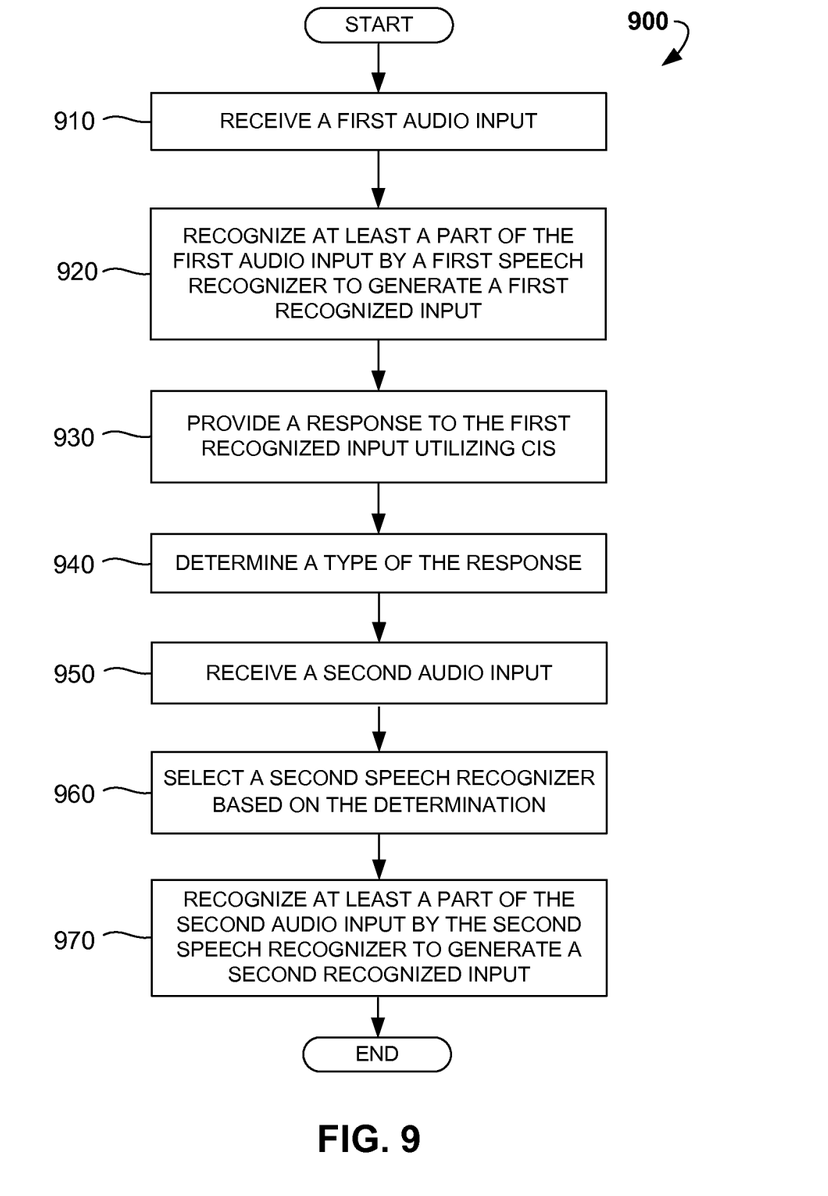
FIG. 9 is a process flow diagram showing yet another method for speech recognition in a CIS according to an example embodiment.

FIG. 9 is a process flow diagram showing yet another method 900 for speech recognition in a CIS according to an example embodiment. The method 900 may be performed by processing logic that may comprise hardware (e.g., decision making logic, dedicated logic, programmable logic, and microcode), software (such as software run on a general-purpose computer system or a dedicated machine), or a combination of both. In one example embodiment, the processing logic resides at the CIS 240 and/or the dialog processor 530. In other words, the method 900 can be performed by various components discussed above with reference to FIGS. 2-5.

As shown in FIG. 9, the method 900 may commence at operation 910, with a communication unit of user device 210 (or of the CIS 240 and/or the dialog processor 530) receiving a first audio input from a user. At operation 920, a first speech recognizer 220 of a plurality of speech recognizers recognizes the first audio input to generate a first recognized input. It should be noted that the first speech recognizer 220 may be dynamically selected based on a number of predetermined rules or criteria (e.g., based on a type of the first audio input, presence of certain triggers or identifiers).

At operation 930, the CIS 240 provides a response to the first recognized input. At operation 940, the CIS 240 may determine a type of the response given, which may predict a type of the following input of the user as will be discussed below. At operation 950, a second audio input may be received. At operation 960, the CIS 240 selects a second speech recognizer 220 of the plurality of speech recognizers based on the type of the response as determined at the operation 940. At operation 970, the second speech recognizer 220 recognizes at least a part of the second audio input to generate a second recognized input. In some embodiments, the first recognized input and the second recognized input may be combined. In some embodiments, the CIS 240 may also provide a second response to the second recognized input.

In an example embodiment, when it is determined at the operation 940 that the type of response of the CIS 240 defines that the second audio input should include a free speech of the user, a free-dictation recognizer is selected as the second speech recognizer 220 at the operation 960. In another example embodiment, when it is determined at the operation 940 that the type of response of the CIS 240 defines that the second audio input should include a pattern-based speech of the user, a pattern-based recognizer is selected as the second speech recognizer 220 at the operation 960.

In yet another example embodiment, when it is determined at the operation 940 that the type of response of the CIS 240 defines that the second audio input should include a name or nickname from a digital address book, an address book based recognizer is selected as the second speech recognizer 220 at the operation 960. In yet another example embodiment, when it is determined at the operation 940 that the type of response of the CIS 240 defines that the second audio input should include an item from a list storing items of the same type (e.g., a geographical location), a dynamically created recognizer is selected as the second speech recognizer 220 at the operation 960.

Figure 10:
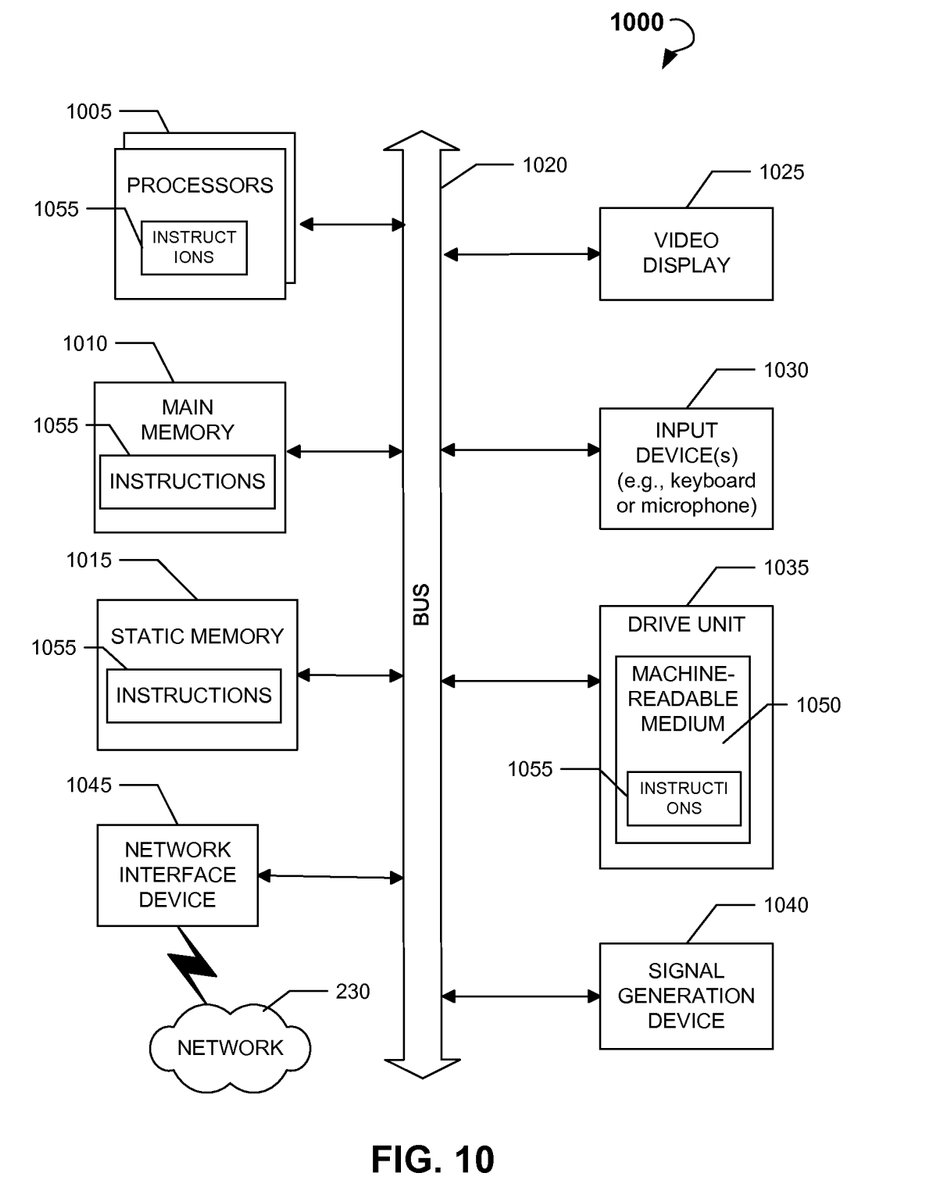
FIG. 10 shows a diagrammatic representation of a computing device for a machine in the example electronic form of a computer system, within which a set of instructions for causing the machine to perform any one or more of the methodologies discussed herein can be executed.

FIG. 10 shows a diagrammatic representation of a computing device for a machine in the example electronic form of a computer system 1000, within which a set of instructions for causing the machine to perform any one or more of the methodologies discussed herein can be executed. In various example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a personal digital assistant (PDA), a cellular telephone, a portable music player (e.g., a portable hard drive audio device, such as an Moving Picture Experts Group Audio Layer 3 (MP3) player), gaming pad, portable gaming console, in-vehicle computer, smart-home computer, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor or multiple processors 1005 (e.g., a central processing unit (CPU), a graphics processing unit (GPU), or both), and a main memory 1010 and a static memory 1015, which communicate with each other via a bus 1020. The computer system 1000 can further include a video display unit 1025 (e.g., a liquid crystal display (LCD) or a cathode ray tube (CRT)). The computer system 1000 also includes at least one input device 1030, such as an alphanumeric input device (e.g., a keyboard), a cursor control device (e.g., a mouse), a microphone, a digital camera, a video camera, and so forth. The computer system 1000 also includes a disk drive unit 1035, a signal generation device 1040 (e.g., a speaker), and a network interface device 1045.

The disk drive unit 1035 includes a computer-readable medium 1050, which stores one or more sets of instructions and data structures (e.g., instructions 1055) embodying or utilized by any one or more of the methodologies or functions described herein. The instructions 1055 can also reside, completely or at least partially, within the main memory 1010 and/or within the processors 1005 during execution thereof by the computer system 1000. The main memory 1010 and the processors 1005 also constitute machine-readable media.

The instructions 1055 can further be transmitted or received over the network 230 via the network interface device 1045 utilizing any one of a number of well-known transfer protocols (e.g., Hyper Text Transfer Protocol (HTTP), CAN, Serial, and Modbus).

While the computer-readable medium 1000 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™ Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Thus, methods and systems for speech recognition are disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

The invention claimed is:

1. A method for speech recognition in a chat information system (CIS), the method comprising:
   receiving, by a processor operatively coupled to a memory, an audio input;
   separating, by the processor, the audio input into a plurality of parts having at least a first part of the audio input and a second part of the audio input;
   selecting, from a plurality of speech recognizers, a specific first speech recognizer to recognize the first part of the audio input, wherein selecting of the specific first speech recognizer to recognize the first part of the audio input is by the processor and is based on predetermined criteria,
   wherein each of the plurality of speech recognizers, from which the specific first speech recognizer is selected to recognize the first part of the audio input, is configured to generate, based on a corresponding audio input, a plurality of outputs provided with corresponding confidence levels;
   recognizing, by the specific first speech recognizer of a plurality of speech recognizers, the first part of the audio input to generate a first recognized input;
   analyzing, by the processor, the first recognized input associated with the first part of the audio input to identify at least one first trigger in the first recognized input;

predicting, by the processor, a type of the second part of the audio input based at least in part on the at least one first trigger;

based on the prediction of the type of the second part of the audio input, selecting, by the processor, a specific second speech recognizer from the plurality of speech recognizers;

recognizing, by the specific second speech recognizer, the second part of the audio input to generate a second recognized input;

analyzing, by the processor, the second recognized input to identify at least one second trigger in the second recognized input;

predicting, by the processor, types of further parts of the audio input based at least in part on triggers identified in recognized inputs;

selecting, from the plurality of speech recognizers, further specific speech recognizers based on the predicted types of the further parts of the audio input, the further specific speech recognizers being in addition to the first speech recognizer and the second speech recognizer; and recognizing, by the further specific speech recognizers, the further parts of the audio input until all parts of the audio input are recognized.

2. The method of claim 1, wherein the separating of the audio input comprises recognizing, by one of the plurality of speech recognizers, at least a beginning part of the audio input to generate a recognized input.

3. The method of claim 2, further comprising selecting, by the processor, the specific first speech recognizer based at least in part on the recognized input.

4. The method of claim 1, wherein the at least one first trigger includes a type of the audio input identified based at least in part on the first recognized input.

5. The method of claim 4, wherein the type of the audio input includes a free speech input or a pattern-based speech input.

6. The method of claim 5, wherein the pattern-based speech input includes at least one of the following: a name, a nickname, a title, an address, and a number.

7. The method of claim 1, wherein the specific first speech recognizer or the specific second speech recognizer includes a pattern-based speech recognizer.

8. The method of claim 1, wherein the specific first speech recognizer or the specific second speech recognizer includes a free-dictation recognizer.

9. The method of claim 1, wherein the specific first speech recognizer or the specific second speech recognizer includes an address book based recognizer.

10. The method of claim 1, wherein the specific first speech recognizer or the specific second speech recognizer includes a dynamically created recognizer.

11. The method of claim 1, further comprising combining, by the processor, the first recognized input and the second recognized input.

12. The method of claim 1, further comprising generating, by the CIS, a response based at least in part on the first recognized input or the second recognized input.

* * * * *